USOO5884054A

United States Patent [19]
Izquierdo et al.

[11] Patent Number: 5,884,054
[45] Date of Patent: Mar. 16, 1999

[54] MULTIPROCESSOR SYSTEM INCLUDING INTERPROCESSOR ENCODING AND DECODING LOGIC FOR COMMUNICATION BETWEEN TWO CARDS THROUGH REDUCED ADDRESSING LINES

[75] Inventors: Javier F. Izquierdo, Houston; John A. Landry, Tomball, both of Tex.

[73] Assignee: Compaq Computer Corporation, Houston, Tex.

[21] Appl. No.: 1,091

[22] Filed: Jan. 6, 1993

Related U.S. Application Data

[63] Continuation of Ser. No. 431,659, Nov. 3, 1989, Pat. No. 5,201,055.

[51] Int. Cl.[6] .................................................. G06F 13/00
[52] U.S. Cl. ........................................ 395/307; 395/280
[58] Field of Search .................................... 395/325, 725, 395/275, 800, 856, 858, 280, 307; 341/50; 371/49.1–71

[56] References Cited

U.S. PATENT DOCUMENTS

| | | | |
|---|---|---|---|
| 4,365,294 | 12/1982 | Stokken | 364/200 |
| 4,365,295 | 12/1982 | Katzman et al. | 364/200 |
| 4,535,403 | 8/1985 | Holland | 364/200 |
| 4,675,840 | 6/1987 | Raymond et al. | 364/200 |
| 4,716,526 | 12/1987 | Mori et al. | 364/200 |
| 4,789,852 | 12/1988 | Bailey et al. | 341/50 |
| 4,837,677 | 6/1989 | Burrus, Jr. et al. | 364/200 |
| 4,858,038 | 8/1989 | Kazama | 360/69 |
| 4,860,004 | 8/1989 | Davis | 340/825.52 |
| 4,866,664 | 9/1989 | Burkhardt, Jr. et al. | 364/900 |
| 4,870,566 | 9/1989 | Cooper et al. | 364/200 |
| 4,882,702 | 11/1989 | Struger et al. | 364/900 |
| 4,970,679 | 11/1990 | Tachiband | 364/900 |
| 5,001,625 | 3/1991 | Thomas et al. | 364/200 |
| 5,038,276 | 8/1991 | Bozzetti et al. | 364/200 |
| 5,060,139 | 10/1991 | Theus | 364/200 |
| 5,119,292 | 6/1992 | Baker et al. | 395/725 |
| 5,201,055 | 4/1993 | Izquierdo et al. | 395/725 |

FOREIGN PATENT DOCUMENTS 63-231660  9/1988  Japan .

OTHER PUBLICATIONS

"IBM Technical Disclosure Bulletin", vol. 31, No. 11, Apr. 1989, New York, NY, pp. 294–296.

*Primary Examiner*—Mehmet B. Geckil
*Attorney, Agent, or Firm*—Pravel, Hewitt & Kimball

[57] ABSTRACT

A method for communication between multiple processors using registers that are accessed by four register select lines which are translated from the original system address. The address translation is performed off of the main processor board to reduce loading effects on the local bus and reduces the pin count of processor board. A signal representing which of the processors is currently active is used as a pseudo address line for the purpose of the translation. The original addresses of the I/O registers may be either input/output or memory mapped.

10 Claims, 8 Drawing Sheets

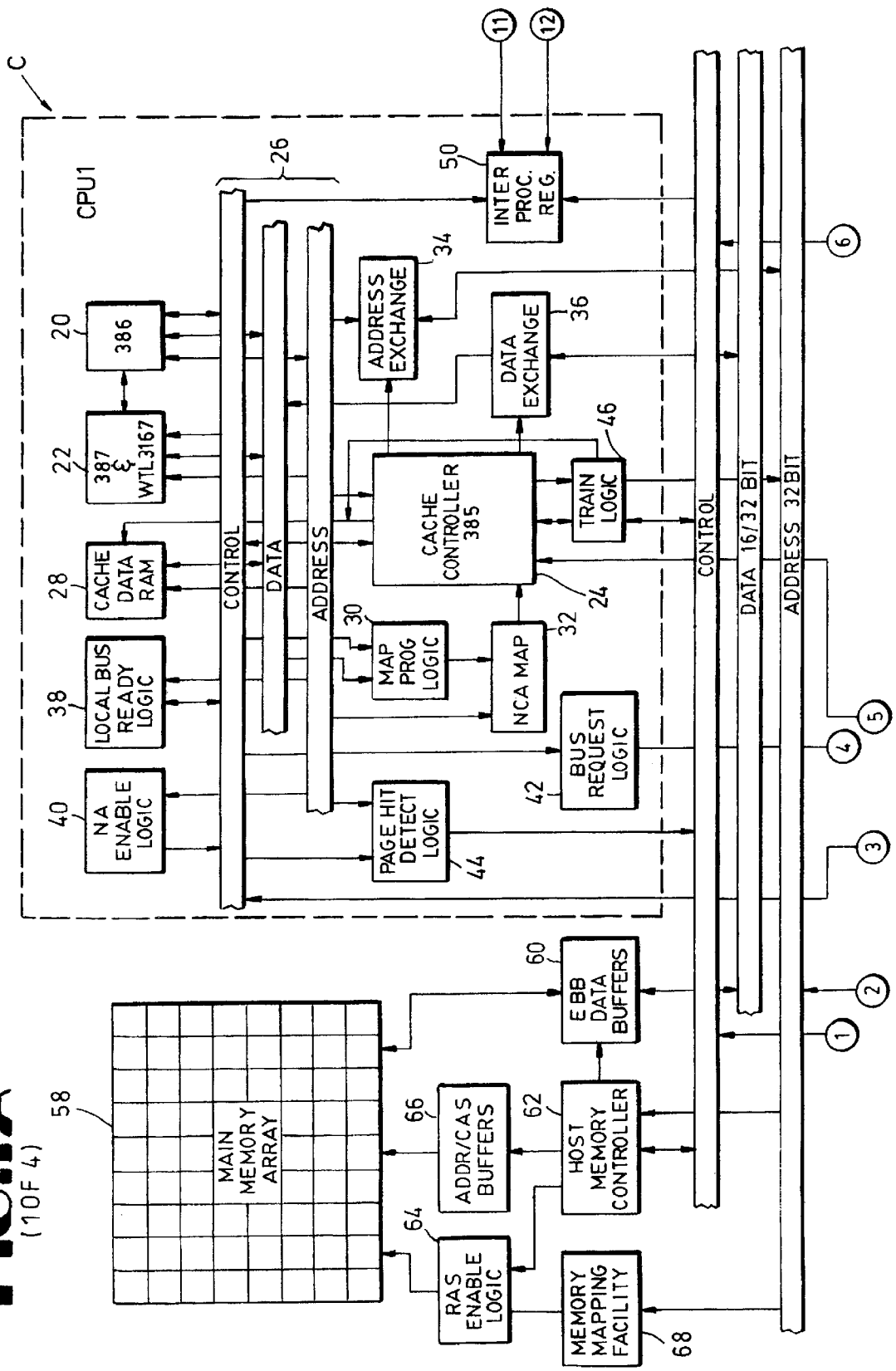

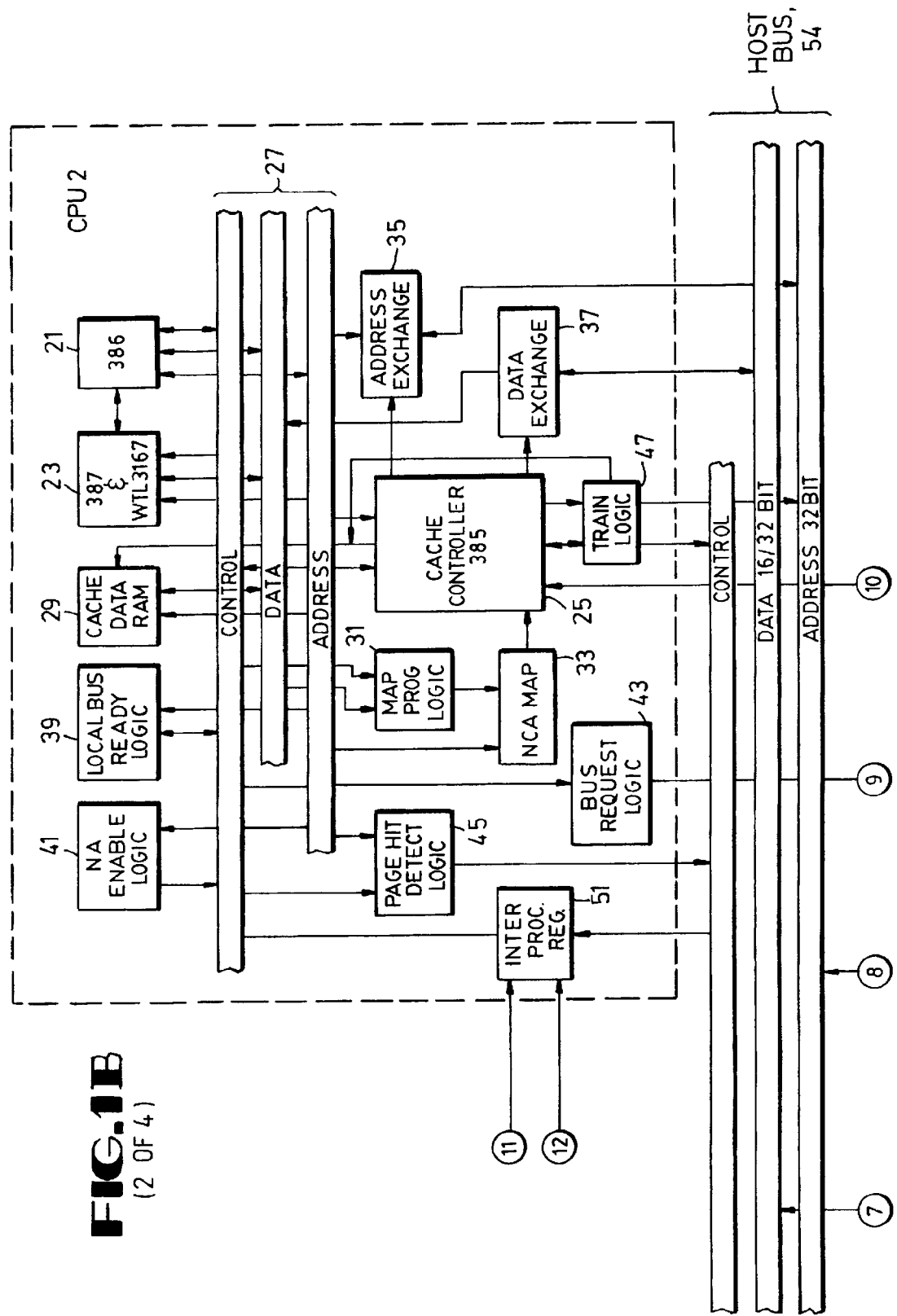
FIG. 1B (2 OF 4)

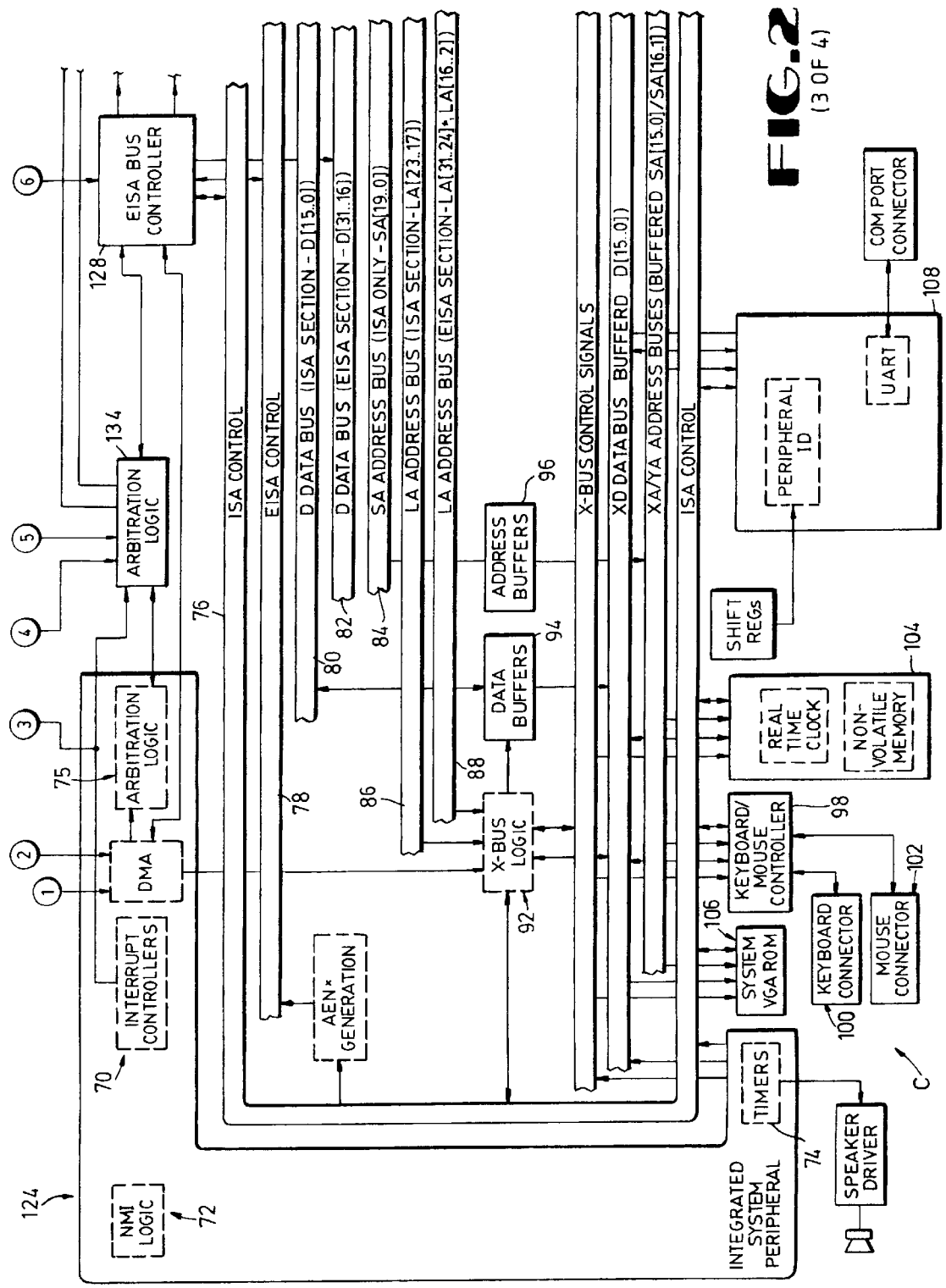

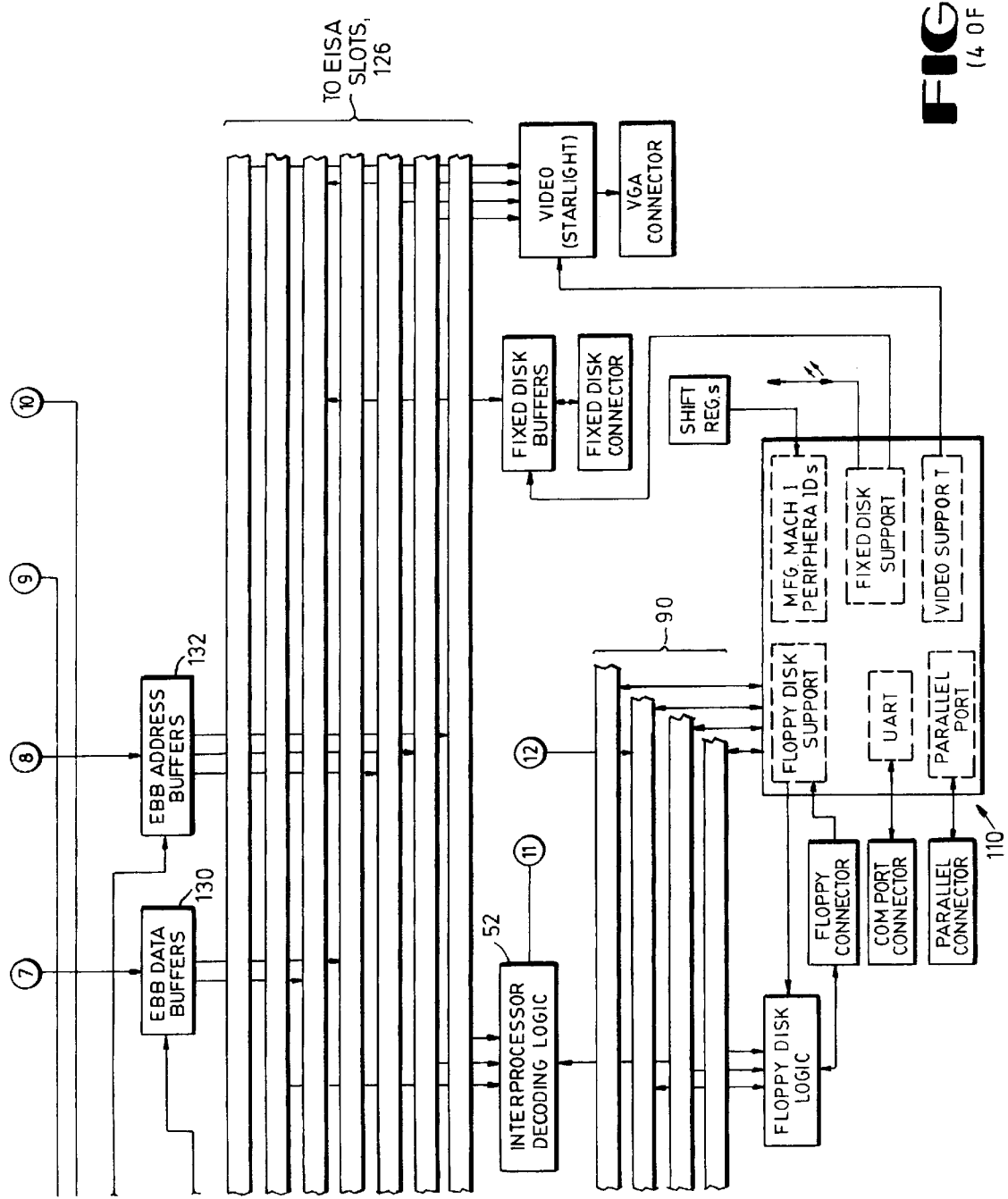
FIG. 2B (4 OF 4)

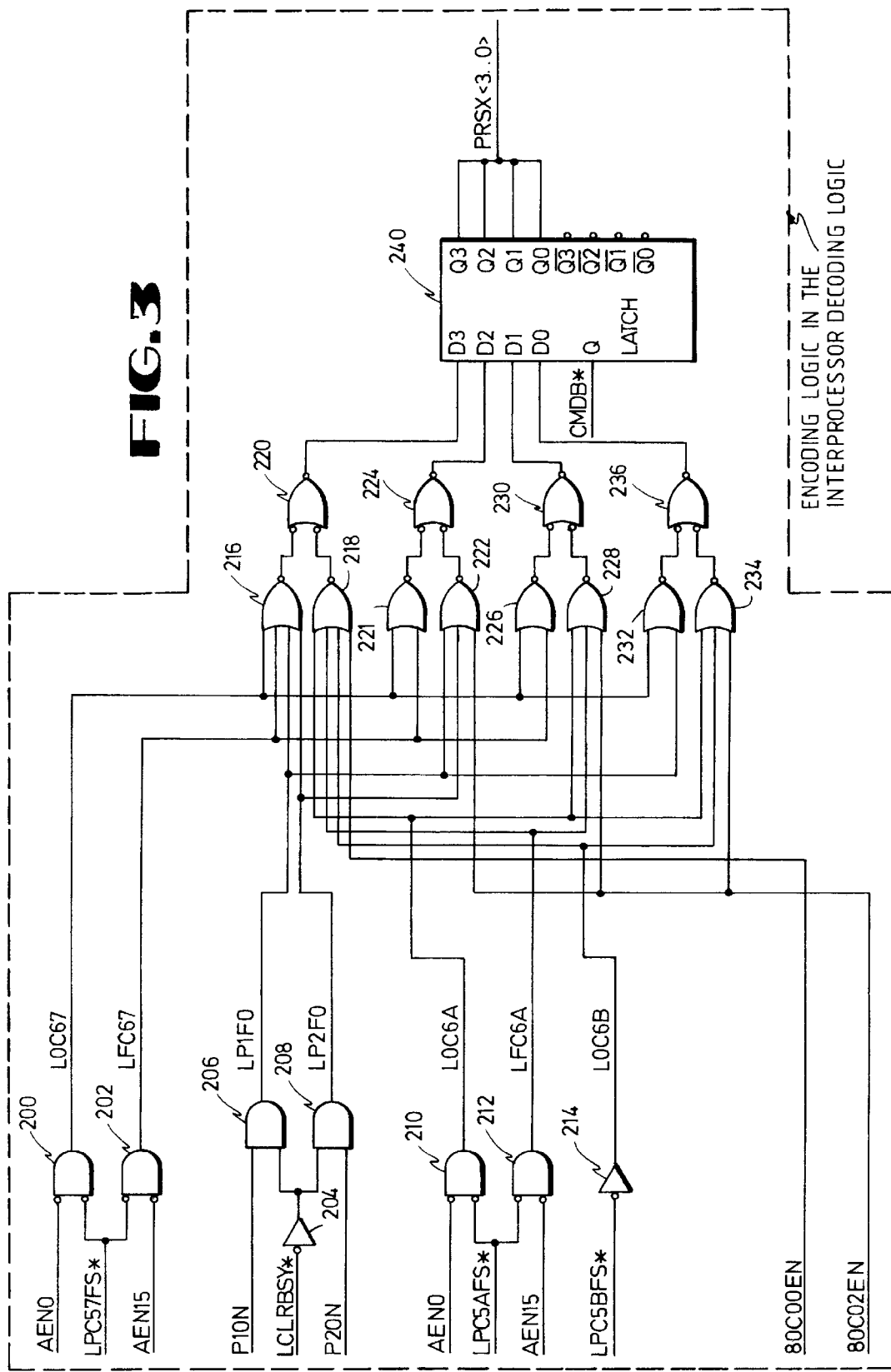

FIG.4

| PORT NAME | P1 | P2 | ADDRESS | PRS<3..0> |
|---|---|---|---|---|
| P1 CACHE CONTROL (I/O) | R/W | | XXXX0C67 | 0 0 0 0 |
| P2 CACHE CONTROL (I/O) | | R/W | XXXXFC67 | 0 0 0 1 |
| P1 NCP INT CLEAR (I/O) | Wp | | XXXX00F0 | 0 0 1 0 |
| P2 NCP INT CLEAR (I/O) | | Wp | XXXX00F0 | 0 0 1 1 |
| P1 CONTROL PORT (I/O) | R/W | | XXXX0C6A | 0 1 0 0 |
| P2 CONTROL PORT (I/O) | Wb3 | R/W | XXXXFC6A | 0 1 0 1 |
| EAI REGISTER (I/O) | R/W | | XXXX0C6B | 0 1 1 0 |
| RAM RELOCATION (MEMORY) | Wp | Wp | 80C00000 | 0 1 1 1 |
| P1 FLUSH CONTROL (MEMORY) | R/W | | 80C00002 | 1 0 0 0 |
| NO PORT SELECTED | — | — | — | 1 1 1 1 |

PORT ADDRESS TRANSLATION CHART

5,884,054

MULTIPROCESSOR SYSTEM INCLUDING INTERPROCESSOR ENCODING AND DECODING LOGIC FOR COMMUNICATION BETWEEN TWO CARDS THROUGH REDUCED ADDRESSING LINES

This is a continuation of application Ser. No. 07/431,659 filed Nov. 3, 1989, now U.S. Pat. No. 5,201,055.

BACKGROUND OF THE INVENTION

1. Field of the Invention

The present invention relates to multiple processors in computer systems, and more particularly to communication between multiple processors using reduced addressing lines.

2. Description of the Prior Art

The personal computer industry is a vibrant and growing field that continues to evolve as new innovations occur. The driving force behind this innovation has been the increasing demand for faster and more powerful personal computers. In order to meet this demand, computer designers have used various methods to increase the speed with which personal computers can process instructions. Historically, the personal computer has developed as a system utilizing a single microprocessor to handle all instruction execution. The microprocessor is the key working unit or "brains" of the personal computer, and its task is to handle all of the instructions that programs give it in the form of computer software.

One method that is being used to increase the speed of the personal computer is the incorporation of multiple microprocessors operating in parallel into a computer system. With the use of multiple processors, or multiprocessing, each microprocessor can be working on a different task at the same time. Systems that incorporate multiprocessing generally use standard microprocessors that operate off of a common bus and share a common memory. The use of multiprocessing has generally increased computer performance, but it has also introduced new design considerations that were not found in a single processor environment.

One consideration that arises in multiprocessing is how to allow the processors to communicate with each other. Communication between the processors in a multiprocessor system is generally necessary for the proper functionality of the system. One method that has been used for multiprocessor communication includes the use of input/output (I/O) registers which enable the processors to pass messages back and forth. The use of I/O registers, however, has conventionally required an address decode using a large number of address and control signals. In computer systems that utilize a 32-bit address bus, this decode may generally include a 16-bit address decode for I/O mapped registers and a 32-bit address decode for memory mapped registers. It would be desirable to locate the communication registers on the local bus to minimize the time spent by each of the processors on interprocessor communication. However, the address decoding requirements hamper this effort because the resultant loading affects are obtrusive on overall system performance. If other address lines are used, they are generally not available on a card containing the microprocessor if the microprocessor is located on an interchangeable card which allows simple replacement of the microprocessors used in the computer system. Thus the 16-bit or 32-bit address lines and additional control signals necessary for the decode must be provided to the card, which may result in an unnecessarily large pin count of the connector used with the card.

SUMMARY OF THE INVENTION

The present invention includes a design that allows multiple processors to communicate with each other with reduced addressing requirements and minimal loading on the local bus. The multiple processors communicate with each other through a series of 8-bit registers located in onboard logic circuitry. The communication registers can be accessed through ports that can be either input/output (I/O) or memory mapped. These ports are decoded from four pseudo address lines, referred to as register select lines, which are translated from actual memory or I/O cycle addresses that are generated by the microprocessor. The decoding of the address lines to develop the register select lines is performed off of the microprocessor board to prevent loading problems.

The communication ports are accessed by the microprocessor via a 32-bit address for memory mapped registers and a 16-bit address for I/O mapped registers. In performing the translation of the address lines to the four register select lines, the decoding logic determines the origin of the current bus cycle and decides which of the multiple processors is executing the cycle. Timing and control of the access to these registers are provided by the Extended Industry Standard Architecture (EISA) bus signals CMD* and W-R, without the requirement of the use of more control lines.

BRIEF DESCRIPTION OF THE DRAWINGS

A better understanding of the present invention can be obtained when the following detailed description of the preferred embodiment is considered in conjunction with the following drawings, in which:

FIGS. 1A, 1B, 2A and 2B are schematic block diagrams of a computer system incorporating the present invention;

FIG. 3 is a schematic diagram of portions of the interprocessor decode circuitry of FIG. 2B according to the present invention;

FIG. 4 is a chart of the various communication ports with their respective addresses and their translated register select addresses according to the present invention;

DESCRIPTION OF THE PREFERRED EMBODIMENT

Figure 5:
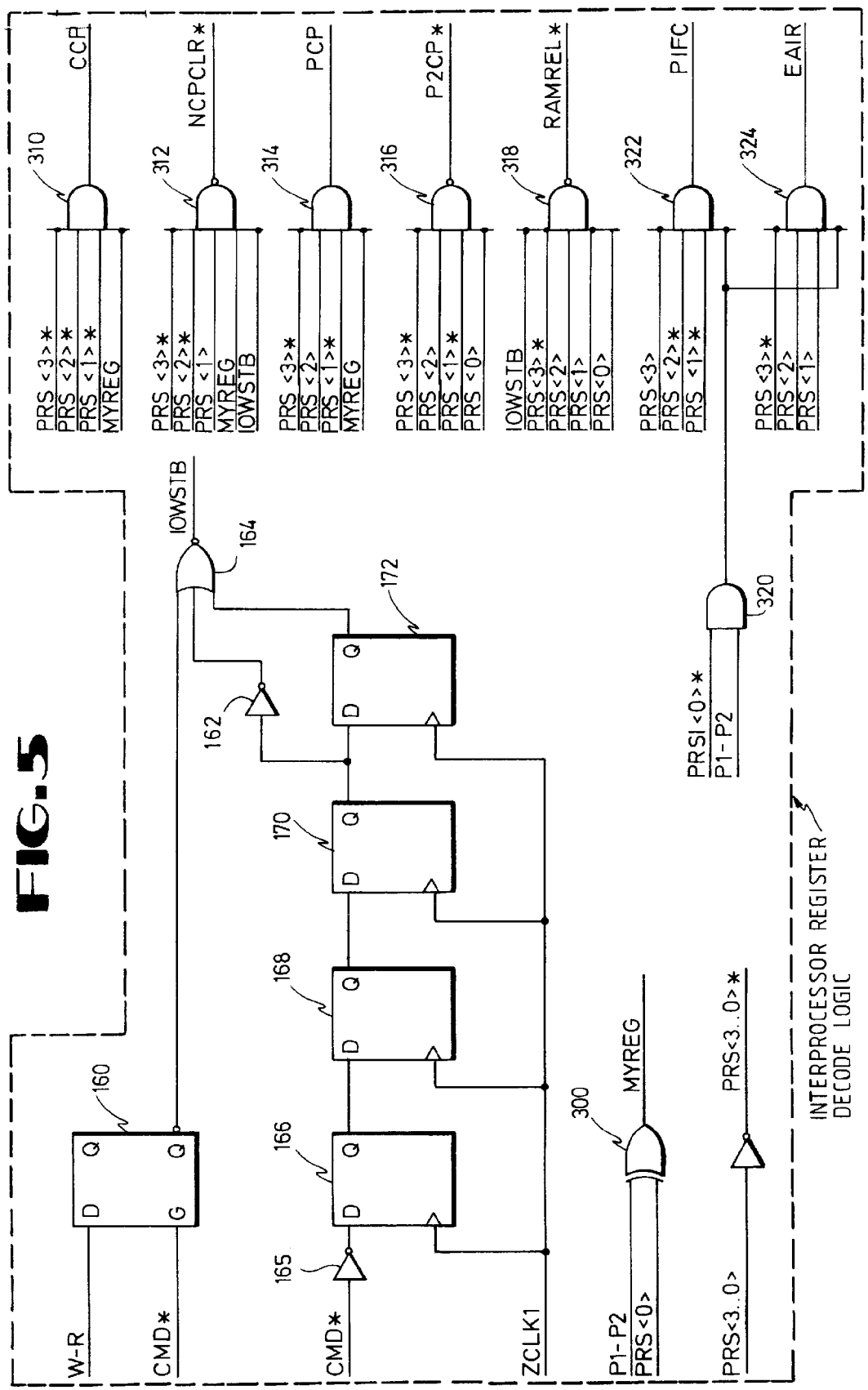
FIG. 5 is a schematic diagram of decode logic associated with the interprocessor registers of FIGS. 1A and 1B according to the present invention.

The present invention has been designed to include two processors sharing a single system bus, but the expansion of this design to include a greater number of processors is also contemplated. The present invention will be discussed in reference to the Industry Standard Architecture (ISA) which was the architecture used in the original International Business Machine Corporation (IBM) PC/AT, and the Extended Industry Standard Architecture (EISA), which is an extended version of the ISA that includes a 32-bit address bus, a 32-bit data bus, and allows for full backwards compatibility with ISA software and devices.

Referring now to FIGS. 1A, 1B, 2A, and 2B, the letter C designates generally a computer system incorporating the present invention. For clarity, system C is shown in four portions, with the interconnections between FIGS. 1A, 1B, 2A and 2B designated by reference to the circled numbers one to ten. System C is comprised of a number of block elements interconnected via four buses. Throughout this specification, signal mnemonics with an asterisk following the signal descriptors that indicates the signal is active at a logic low level. Signal mnemonics having numbers or ranges between angled brackets refer to those particular bits or positions in a bus.

In FIGS. 1A and 1B, a computer system is depicted. The computer system C generally includes a primary central processing unit referred to as CPU1, and a secondary central processing unit referred to as CPU2. As the central processing units are essentially similar in content, the following description of CPU1 and CPU2 is combined for the purpose of simplicity. Each central processing unit, CPU1 and CPU2, comprises a processor 20 and 21, a numerical coprocessor 22 and 23 and a cache memory controller 24 and 25, respectively as well as associated logic circuits connected to a local processor bus 26 and 27, respectively. Associated with each cache controller 24 and 25 is high speed cache data random access memory (RAM) 28 and 29, noncacheable memory address (NCA) map programming logic circuitry 30 and 31, noncacheable address memory 32 and 33, address exchange latch circuitry 34 and 35, page hit detect logic circuitry 44 and 45 for use with page mode main memory devices, train logic circuitry 46 and 47 to allow use of a 64 kbyte cache with the preferred cache controller 24 and 25 and data exchange transceivers 36 and 37, respectively. Associated with CPU1 and CPU2 also are local bus ready logic circuitry 38 and 39, next address enable logic circuitry 40 and 41 and bus request logic circuitry 42 and 43, respectively.

Each processor 20 and 21 is preferably an Intel 80386 microprocessor operating at 33 MHZ. Alternatively, each CPU could be based on an Intel 80486 microprocessor coupled with external cache memory. In that instance the noncacheable address-related items are not present on the CPU. Each processor 20 and 21 has its control, address and data lines interfaced to its local processor bus 26 and 27, respectively. The coprocessor 22 and 23 is preferably an Intel 80387 and/or Weitek WTL 3167 numeric coprocessor interfacing with the respective local processor bus 26 and 27 and the processor 20 and 21 in the conventional manner. Each cache RAM 28 and 29 is preferably suitable high-speed static random access memory which interfaces with the address and data elements of the respective bus 26 and 27 under control of the respective cache controller 24 and 25 to carry out required cache memory operations. Each cache controller 24 and 25 is preferably an Intel 82385 cache controller configured to operate in two-way set associative master mode. In the preferred embodiment the components are the 33 MHz versions of the respective units. Address latch circuitry 34 and 35 and data transceiver 36 and 37 interface the respective cache controller 24 and 25 with the processor 20 and 22 and provide a local bus interface between the local processor bus 26 and 27 and a host bus 54.

The main memory array 58 is preferably dynamic random access memory. Memory 58 interfaces with the host bus 54 via a data buffer circuit referred to as the EISA bus buffer (EBB) 60, a memory controller circuit 62 and a memory mapping circuit 68. The buffer 60 performs data transceiving and parity generating and checking functions. The memory controller 62 and the memory mapping facility 68 interface with the memory 58 via address multiplexer and column address strobe (ADDR/CAS) buffers 66 and row address strobe (RAS) enable logic circuit 64.

Interfaced to the control bus of each of the local processor buses 26 and 27 are the interprocessor registers 50 and 51 with their associated register select decode logic. The interprocessor registers 50 and 51 are connected to interprocessor decoding logic 52 (FIG. 2B) which includes translation logic that translates the respective register full address into four register select lines which are used to access the communication ports in the interprocessor registers 50 and 51. The register select decode logic associated with each of the interprocessor registers 50 and 51 decodes the four register select lines into signals which properly access the respective interprocessor registers 50 and 51.

In the drawings, system C is configured having the processor bus 26, the host bus 54, an extended industry standard architecture (EISA) bus 126 (FIG. 2) and an X bus 90. The details of the portion of the system illustrated in FIGS. 2A and 2B are not discussed in detail below and are generally not significant to the present invention other than to illustrate an example of a fully configured computer system. The EISA specification Version 3.1 is included as Appendix 1 to U.S. Pat. No. 5,101,492 issued Mar. 31, 1992, which Appendix is hereby incorporated by reference, and fully explains the requirements of an EISA system. The portion of system C illustrated in FIGS. 2A and 2B is essentially a configured EISA system which includes the necessary EISA bus 126, an EISA bus controller 128, data latches and transceivers 130 and address latches and buffers 132 to interface between the EISA bus 126 and the host bus 54. Also illustrated in FIGS. 2A and 2B is an integrated system peripheral 124, which incorporates a number of the elements used in an EISA-based computer system.

The EISA bus 126 includes ISA and EISA control buses 76 and 78, ISA and EISA data buses 80 and 82 and address buses 84, 86 and 88. System peripherals are interfaced via the X bus 90 in combination with the ISA control bus 76 from the EISA bus 126. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations and a block circuit 104 which includes a real time clock and CMOS nonvolatile memory. A serial communications port 108 is also connected to the system C via the X bus 90. Floppy and fixed disk support, a parallel port, a second serial port, and video support circuits are provided in block circuit 110.

Communication between the multiple processors is accomplished through the registers that are located in the interprocessor registers 50 and 51 coupled to the interprocessor decode logic 52. Each of the individual registers in the interprocessor registers 50 and 51 can be indirectly accessed through an actual EISA memory or I/O space address. In the computer system C according to the present invention, I/O space addresses are 16 bits in width and memory space addresses are 32 bits in length with the M-IO signal serving a differentiation function. The actual addresses are translated by the interprocessor decoding logic 52 into four pseudo address lines referred to as the processor register select lines PRS<3-0>. The translation involves decoding the full 16-bit or 32-bit register addresses into respective decoded address signals. These decoded address signals are then encoded to form the PRS<3-0> lines.

The interprocessor decoding logic 52 contains standard address decoding logic that generates an appropriate decoded signal representing the I/O or memory address of the particular register being referenced. Because the details of the combinational logic used in the interprocessor decoding logic 52 to perform the actual detection of a particular address value from the address lines LA and XA are well known to those skilled in the art, the details of the logic circuitry required to generate these decoded signals has been omitted for the purpose of clarity and only the final output of the decodes are illustrated. The decoded address signals include the LPC67FS* signal, which represents that an address of XXXX XC67h is being provided on the address lines LA and XA, with the X indicating a don't care state; the LPC6AFS* signal, which represents that an address of XXXX XC6Ah is being provided; the LPC6BFS* signal, which represents that an address of XXXX XC6Bh is being provided; the LCLRBSY* signal, which represents that an address of XXXX X0F0h is being provided; the 80C00EN signal, which represents that memory address 80C00000h is being provided; and the 80C02EN signal, which represents that memory address 80C00002h is being provided.

The interprocessor decoding logic 52 also utilizes certain control signals to aid in the generation of the PRS<3-0> lines. The control signals used include the AEN0 and AEN15 signals and the P1ON and P2ON signals. The P1ON and P2ON signals represent whether CPU1 or CPU2, respectively, is currently active. As shown in FIG. 4, address XXXX 00F0h has two possible PRS translations dependent on whether CPU1 or CPU2 is accessing the address, and the P1ON and P2ON signals are used to differentiate between these two cases. The AEN0 and AEN15 signals are EISA signals which, when low, represent that a system board I/O space access is occurring. The AEN0 signal represents that the four address bits 15–12 of the LA address bus 88, which represent the particular EISA I/O slot being accessed, are value 0h for the system board access, while the AEN15 signal represents that the four address bits of an I/O port address have the value Fh. The EISA slot-specific I/O ranges are decoded from the LA<15:2> address lines when LA<9:8> address lines have a zero value. Thus the AEN0 signal is low when an I/O space address of 0000h-00FFh, 0400h-04FFh, 0800h-08FFh or 0C00h-0CFFh is presented, while the AEN15 signal is low when an I/O space address of F000h-F0FFh, F400h-F4FFh, F800h-F8FFh, or FC00h-FCFFh is presented.

Referring now to FIG. 3, the interprocessor decoding logic 52 utilizes the above-mentioned decoded address signals and control signals to generate the PRS<3-0> lines. The AEN0 signal and the LPC67FS* signal are connected to the inputs of a two-input NOR gate 200 whose output is a signal referred to as L0C67. The L0C67 signal represents when asserted that I/O port address 0C67H is being accessed. Thus the AEN0 signal is being used to qualify the address as an I/O address. The LPC67FS* signal and the AEN15 signal are connected to the inputs of a two-input NOR gate 202 whose output is a signal referred to as LFC67. The LFC67 signal represents when asserted that port address FC67h is being accessed. The LCLRBSY* signal is connected to the input of an inverter 204 whose output is connected to the input of a two-input AND gate 206, the second input of which is the P1ON signal. The output of the two input AND gate 206 is a signal referred to as LP1F0 which represents when asserted that CPU1 is accessing port address 00F0h which clears the numeric coprocessor interrupt of the CPU1 coprocessor. The output of the inverter 204 and the P2ON signal are inputs to a two-input AND gate 208, whose output is a signal referred to as LP2F0. The LP2F0 signal represents when asserted that CPU2 is accessing port address 00F0h, which clears the interrupt of the CPU2 coprocessor. Thus both CPU1 and CPU2 clear their related numeric coprocessor interrupts by writing to the same address, thus not requiring that software running on the system determine the processor on which it is running.

The LPC6AFS* signal and the AEN0 signal are connected to the inputs of a two-input NOR gate 210 whose output is a signal referred to as L0C6A. The L0C6A signal represents when asserted that I/O port address 0C6Ah is being accessed. The LPC6AFS* signal and the AEN15 signal are connected to the inputs of a two-input NOR gate 212 whose output is a signal referred to as LFC6A. The LFC6A signal represents when asserted that port address I/O FC6Ah is being accessed. The LPC6BFS* signal is connected to the input of an inverter 214 whose output is a signal referred to as L0C6B. The L0C6B signal represents when asserted that I/O port address 0C6Bh is being accessed.

The L0C67 signal, the LFC67 signal, the LP1F0 signal, and the LP2F0 signal are inputs to a four-input NOR gate 216. The L0C6A signal, the LFC6A signal, the L0C6B signal and the 80C00EN signal are inputs to a four-input NOR gate 218. The outputs of the four-input NOR gates 216 and 218 are connected to the inputs of a two-input AND gate 220. The L0C67 signal and the LFC67 signal are inputs to a two-input NOR gate 221. The LP1F0 signal, the LP2F0 signal, and the 80C02EN signal are inputs to a three-input NOR gate 222. The outputs of the two-input NOR gate 221 and the three-input NOR gate 222 are connected to the inputs of a two-input AND gate 224. The L0C67 signal and the LFC67 signal are inputs to a two-input NOR gate 226. The L0C6A signal, the LFC6A signal and the L0C6B signal are inputs to a three-input NOR gate 228. The outputs of the two-input NOR gate 226 and the three-input NOR gate 228 are connected to the inputs of a two-input AND gate 230. The L0C67 signal and the LP1F0 signal are inputs to a two-input NOR gate 232. The L0C6A signal, the L0C6B signal and the 80C02EN signal are inputs to a three-input NOR gate 234. The outputs of the two-input NOR gate 232 and the three-input NOR gate 234 are connected to the inputs of a two-input AND gate 236.

The outputs of the two-input AND gates 220, 224, 230 and 236 are connected to the D3, D2, D1 and D0 inputs, respectively, of a four-bit latch 240. The Q3, Q2, Q1 and Q0 outputs of the four-bit latch 240 generate the PRS lines PRS<3>, PRS<2>, PRS<1> and PRS<0>, respectively. The CMD* signal, which is a timing control signal on the EISA bus 126 which indicates that the data portion of the cycle is active, is connected to the gating input of the four-bit latch 240. Therefore, the PRS outputs are latched on the falling edge of the CMD* signal and remain latched until the next rising edge of the CMD* signal.

Referring now to FIG. 4, the encoding of the PRS<3-0> signals for each of the CPU's is shown. The PRS<3-0> signal value of 1111 indicates that no register has been selected, so there are 15 available locations using the four bits of the preferred embodiment, nine of which are shown in FIG. 4. However, the use of a greater number of PRS bits and hence a greater number of I/O ports is also contemplated.

Referring now to FIG. 5, the decoding logic associated with the interprocessor registers 50 and 51 is used to generate appropriate decoded signals from the PRS<3-0> lines which access the I/O communication ports. A signal referred to as P1/P2 is used to differentiate between whether the interprocessor registers 50 and 51 are used in a CPU1 application or a CPU2 application, thus relieving software of this duty. The P1/P2 signal is asserted high for a CPU1 application and is negated low for a CPU2 application.

Timing and control for the decoding logic is provided by the EISA signal CMD*, which is a timing control signal used within a cycle, and a write/read signal referred to as W-R. These signals are used to generate an I/O write strobe signal referred to as IOWSTB. The W-R signal is connected to the D input of a latch 160, whose inverted Q output is connected to the input of a three-input NOR gate 164. The CMD* signal is connected to the gating input of the latch 160.

The CMD* signal is connected to the input of an inverter 165 whose output is connected to the D input of a D-type flip-flop 166, whose Q output is connected to the D input of a D-type flip flop 168, whose Q output is connected to the D input of a D-type flip-flop 170, whose Q output is connected to the D input of a D-type flip flop 172. The Q output of the D-type flip-flop 170 is also connected to the input of an inverter 162, whose output is connected to an input of the three-input NOR gate 164. The Q output of the D-type flip flop 172 is connected to an input of the three-input NOR gate 164. A clocking signal referred to as ZCLK1, which has a nominal duty cycle of 75% with a frequency equivalent to that of the system clock and a rising edge which coincides with the rising edge of the system clock, is connected to the clocking inputs of the D-type flip flops 166, 168, 170, 172. The output of the three-input NOR gate 164 is a write strobe signal referred to as IOWSTB. The IOWSTB signal is asserted three ZCLK1 signal cycles after the CMD* signal is asserted low during a write cycle, and the IOWSTB signal remains asserted for one ZCLK1 signal cycle.

The P1/P2 signal and the PRS<0> signal are inputs to a two-input XOR gate 300, the output of which is a signal referred to as MYREG. As shown in FIG. 4, where a P1 and a P2 version of a port exists, the PRS<0> line is used to differentiate between which of the ports is being accessed. Therefore, the MYREG signal operates as the PRS<0> line with the added functionality of preventing a processor from writing to the other processors port.

The PRS<3>* signal, the PRS<2>* signal, the PRS<1>* signal, and the MYREG signal are inputs to a four-input AND gate 310, the output of which is a signal referred to as CCP which represents, when asserted, that the respective cache controller port is being accessed. The PRS<3>* signal, the PRS<2>* signal, the PRS<1> signal, the MYREG signal, and the IOWSTB signal are inputs to a five-input NAND gate 312, the output of which is a signal referred to as NCPCLR*, which indicates, when asserted, that the respective numeric coprocessor interrupt is being cleared. The NCPCLR* signal is the write pulse generated by the respective P1 or P2 numeric coprocessor NCP port referred to in FIG. 4, with the pulse clearing the interrupt from the numeric coprocessor. The PRS<3>* signal, the PRS<2> signal, the PRS1* signal, and the MYREG signal are inputs to a four-input AND gate 314, the output of which is a signal referred to as PCP, which represents that the respective processor control port is being accessed.

In the above decoding logic, the MYREG signal dictates that the processor may only access its respective port and not the others. However, in the following two ports, the absence of the MYREG signal allows the ports to be accessed by either processor. The PRS<3>* signal, the PRS<2> signal, the PRS<1>* signal, and the PRS<0> signal are inputs to a four-input NAND gate 316, the output of which is a signal referred to as P2CP*, which represents that the CPU2 control port is being accessed. The IOWSTB signal, the PRS<3>* signal, the PRS<2> signal, the PRS<1> signal, and the PRS<0> signal are inputs to a five-input NAND gate 318, the output of which is a signal referred to as RAMREL* which indicates that the RAM relocation register is being accessed.

The PRS<0>* signal and the P1/P2 signal are inputs to a two-input AND gate 320. The PRS<3> signal, the PRS<2>* signal, the PRS<1>* signal, and the output of the two-input AND gate 320 are inputs to a four-input AND gate 322 whose output is a signal referred to as P1FC which represents that the P1 cache flush control control port is being accessed. The PRS<3>* signal, the PRS<2> signal, the PRS<1> signal, and the output of the two-input AND gate 320 are inputs to a four-input AND gate 324 whose output is a signal referred to as EAIR, which represents that the EAI register is being accessed. The AND gate 320 dictates that the P1 flush control register and the EAI register may only be accessed by CPU1.

Figure 6:
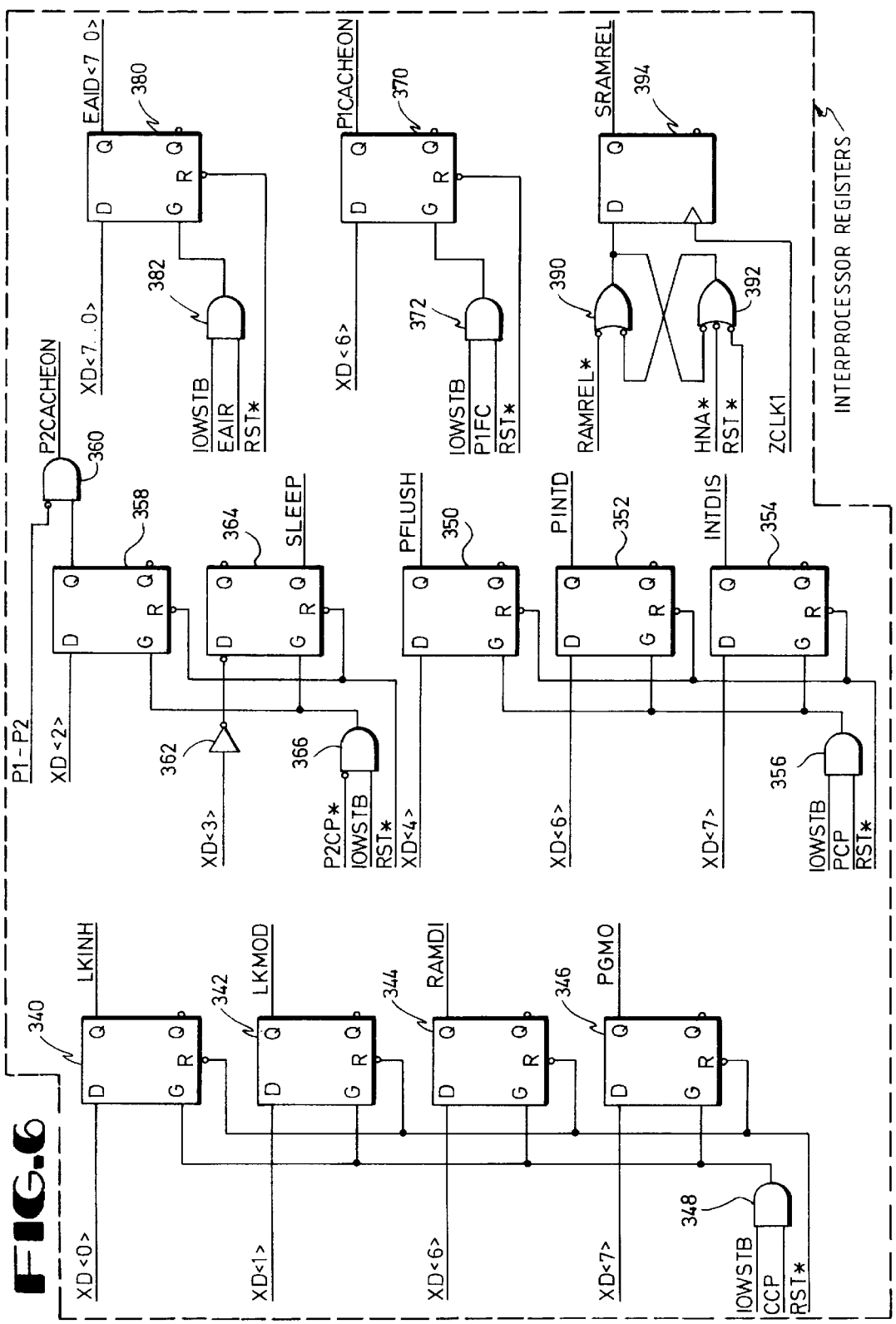
FIG. 6 is a schematic diagram of the interprocessor registers of FIGS. 1A and 1B according to the present invention.

Referring now to FIG. 6, the above decoded signals from the PRS<3-0> lines are used to access the respective I/O communication registers. As shown in FIG. 4, the communication ports include cache control ports, numeric coprocessor ports and processor control ports, among others. The P1 and P2 NCP ports do not include read/write registers but only generate a write pulse signal, this being the NCPCLR* signal generated as shown in FIG. 5. The following description is included to demonstrate how the I/O communication ports are accessed, and the various status signals generated by the ports which are mentioned below are not discussed in detail and are not relevant to the present invention.

The registers are written to by bits on the data bus represented by the appropriate data line XD<>. The XD<0> signal is connected to the D-input of a latch 340, whose Q output is a lock inhibit signal referred to as LKINH. The XD<1> signal is connected to the D input of a latch 342 whose Q output is a lock modify signal referred to as LKMOD. The XD<6> signal is connected to the D input of a latch 344 whose Q output is a NCA RAM data signal referred to as RAMDI. The XD<7> signal is connected to the D input of a latch 346 whose Q output is a NCA programming bit referred to as PGMO. The IOWSTB signal and the CCP signal are inputs to a two-input AND gate 348, whose output is connected to the gating inputs of each of the latches 340, 342, 344 and 346. Therefore, when the respective CPU is writing to its respective cache control port the gating input of each of the latches 340, 342, 344 and 346 is asserted, allowing them to latch their respective data from the data bus on the falling edge of the gating signal. The RST* signal is connected to the inverted reset inputs of each of the four latches 340, 342, 344 and 346.

The XD<4> is connected to the D-input of a latch 350 whose Q output is a flush signal referred to a PFLUSH. The XD<6> signal is connected to the D-input of a latch 352 whose Q output is a processor interrupt signal referred to as PINTD. The XD<7> signal is connected to the D-input of a latch 354 whose Q output is an interrupt disable signal referred to as INTDIS. The IOWSTB signal and the PCP signal are inputs to a two-input AND gate 356 whose output is connected to the gating inputs of each of the latches 350, 352 and 354. Therefore, when the respective CPU is accessing its respective processor control port, then each of the gating inputs of the latches 350, 352 and 354 are asserted high allowing them to latch their respective inputs from the data line on the falling edge of the gating signal. The RST* signal is connected to each of the inverted reset inputs of the latches 350, 352 and 354.

The XD<2> signal is connected to the D-input of a latch 358 whose Q output is connected to the input of a two-input AND gate 360. The P1/P2 signal is connected to the other inverted input of the two-input AND gate 360 whose output is a cache control signal referred to as P2CACHEON. The XD<3> signal is connected to the input of an inverter 362 the output of which is connected to the inverted D-input of a latch 364 whose Q output is a signal referred to as SLEEP. When set to 1, the SLEEP bit disables CPU2 by preventing it from accessing the host bus 54. The SLEEP bit may be written to by both CPU1 and CPU2, thus allowing either CPU1 or CPU2 to place CPU2 to sleep. The P2CP* signal is connected to the inverted input of a two-input AND gate 366, the second input of which is the IOWSTB signal. The output of the two-input AND gate 366 is connected to the gating inputs of each of the latches 358 and 364. Therefore, when either processor writes to the P2 control port, the gating inputs of the latches 358 and 364 are latched, allowing them to receive their respective data. The RST* signal is supplied to the inverted reset inputs of the latches 358 and 364.

The XD<6> signal is connected to the D-input of a latch 370 whose Q output is a cache control signal referred to a P1CACHEON. The IOWSTB and the P1FC signal are inputs to a two-input AND gate 372 whose output is connected to the gating input of the latch 370. The RST* signal is connected to the inverted reset input of the latch 370.

The XD<7..0> lines are connected to the inputs of an eight-bit latch 380 whose Q outputs are signals referred to as EAID<7..0>. The IOWSTB signal and the EAIR signal are inputs to a two-input AND gate 382 whose output is connected to the gating input of the eight-bit latch 380. The RST* signal is connected to the inverted reset input of the eight-bit latch 380.

The RAMREL* signal is connected to the input of a two-input NAND gate 390. A host bus next address signal referred to as HNA*, the RST* signal, and the output of the two-input NAND gate 390 are inputs to a three-input NAND gate 392, the output of which is an input to the two-input NAND gate 390. The output of the two-input NAND gate 390 is also connected to the D-input of a D-type flip-flop 394 whose Q output is a RAM relocation signal referred to as SRAMREL. The ZCLK1 signal is connected to the clocking input of the D-type flip-flop 394.

Therefore, where 16-bit or 32-bit address decodes and numerous control lines were formerly required to access the interprocessor communication registers, now four register select lines and two control lines perform the same function. The incorporation of the processor active signals P1ON and P2ON to aid in the register decode enables two I/O ports to reside at the same system address. Furthermore, the location of the interprocessor decoding logic off of the main processor boards reduces the loading effects that a full address decode would have on the local bus and the translation of the full address to a lesser number of register select lines reduces the number of pins necessary when the CPU is located on an interchangeable card.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A method operable by an electronic device for selecting one of a plurality of devices each having a data width and which are addressed using a first number of address lines, wherein each of the devices is coupled to a data bus having a data width, and wherein the data width of each device is less than or equal to the data bus width, the method comprising:

decoding said first number of address lines to produce a plurality of signals each representing selection of a different one of the devices;

encoding said plurality of selection representing signals into a set of addressing signals having an encoded value wherein each encoded value represents a different one of the devices and the number of signals in said set is less than said first number;

decoding said encoded set of addressing signals to produce a signal representing selection of one of the devices; and selecting the device using said selection signal.

2. The method of claim 1, wherein said devices are input/output registers.

3. The method of claim 1, wherein a processor generates said first number of address lines, the processor also generating a plurality of control signals and wherein said encoding step includes receiving a control signal from said processor and using said control signal to facilitate generation of said set of addressing signals.

4. The method of claim 3, wherein said control signal received in said encoding step is a signal indicative of which of a plurality of processors is currently active.

5. The method of claim 1, wherein said first number of address lines produces addresses which reside in either a memory space or an input/output space, wherein the devices are located in both said memory space and said input/output space.

6. An apparatus for selecting one of a plurality of devices each having a data width and which are addressed using a first number of address lines, wherein each of the devices is coupled to a data bus having a data width, and wherein the data width of each device being less than or equal to the data bus width, the apparatus comprising:

means receiving said first number of address lines for decoding said first number of address lines to produce a plurality of signals each representing selection of a different one of the devices;

means coupled to said means for decoding said first number of address lines for encoding said plurality of signals representing selection of a device into a set of addressing signals having an encoded value wherein each encoded value represents a different one of the devices and the number of signals in said set is less than said first number;

means coupled to said encoding means for decoding said encoded set of addressing signals to produce a signal representing selection of one of the devices;

means coupled to said encoded signal set decoding means for selecting the device using said selection signal.

7. The apparatus of claim 6, wherein said devices are input/output registers.

8. The apparatus of claim 6, wherein a processor generates said first number of address lines, the processor also generating a plurality of control signals, and wherein said encoding means receives a control signal from the processor and uses said control signal to facilitate generation of said set of addressing signals.

9. The apparatus of claim 8, wherein said control signal received by said encoding means is a signal indicative of which of a plurality of processors is active.

10. A method operable by an electronic device for selecting one of a plurality of devices in a computer system comprising a plurality of processors which each include a first number of address lines which address the devices, the devices each having the same address for each of the processors, and a means for generating a signal that determines which of the processors is currently active, the method comprising;

decoding said plurality of address lines to produce a plurality of signals each representing selection of a different one of the devices;

encoding said plurality of selection representing signals into a set of signals having an encoded value wherein each encoded value represents a different one of the devices and the number of signals in said set is less than said first number;

utilizing said processor active signal to decode said encoded set of signals to produce a second signal representing selection of a device; and selecting the device using said second selection signal.

\* \* \* \* \*